US007400955B2

(12) United States Patent
Baumann et al.

(10) Patent No.: US 7,400,955 B2
(45) Date of Patent: Jul. 15, 2008

(54) PROCEDURE TO DIAGNOSE A FUEL TANK VENTILATION SYSTEM AND DEVICE TO IMPLEMENT THE PROCEDURE

(75) Inventors: Andreas Baumann, Farmington Hills, MI (US); Martin Streib, Vaihingen (DE); Andreas Pape, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/731,515

(22) Filed: Mar. 30, 2007

(65) Prior Publication Data

US 2007/0239330 A1 Oct. 11, 2007

(30) Foreign Application Priority Data

Apr. 5, 2006 (DE) ........................ 10 2006 016 339

(51) Int. Cl.
*G01M 17/00* (2006.01)

(52) U.S. Cl. ........................................... 701/29; 701/31

(58) Field of Classification Search ................... 701/29, 701/103, 112, 123, 31; 137/571; 123/519, 123/520, 585, 586

See application file for complete search history.

(56) References Cited

U.S. PATENT DOCUMENTS 7,050,900 B2 * 5/2006 Miller et al. ................ 701/103
7,128,064 B2 * 10/2006 Heider ........................ 123/585
7,273,045 B2 * 9/2007 Kurtz et al. .............. 123/568.2

FOREIGN PATENT DOCUMENTS

DE 43 42 431 A1 6/1995
DE 196 48 711 A1 5/1998
DE 103 32 701 A1 2/2005

* cited by examiner

*Primary Examiner*—Richard M. Camby
(74) *Attorney, Agent, or Firm*—Merchant & Gould P.C.

(57) ABSTRACT

A procedure to diagnose a fuel tank ventilation system of a motor vehicle and a device to implement the procedure are proposed. The fuel tank ventilation system contains at least one first ventilation pathway discharging into the air intake area of the internal combustion engine downstream behind a supercharger as well as at least one second ventilation pathway discharging into the air intake area upstream in front of the supercharger. Provision is made for a diagnosis with at least two partial diagnoses, whereby the first partial diagnosis pertaining to the first ventilation pathway is implemented, if the intake manifold pressure in the discharge area of the first ventilation pathway is smaller than the fuel tank system pressure; and the second partial diagnosis pertaining to the second ventilation pathway is implemented, if the intake manifold pressure in the discharge area of the first ventilation pathway is greater than the fuel tank system pressure. An error signal is provided, if at least one of the partial diagnoses generates a partial error signal.

18 Claims, 1 Drawing Sheet

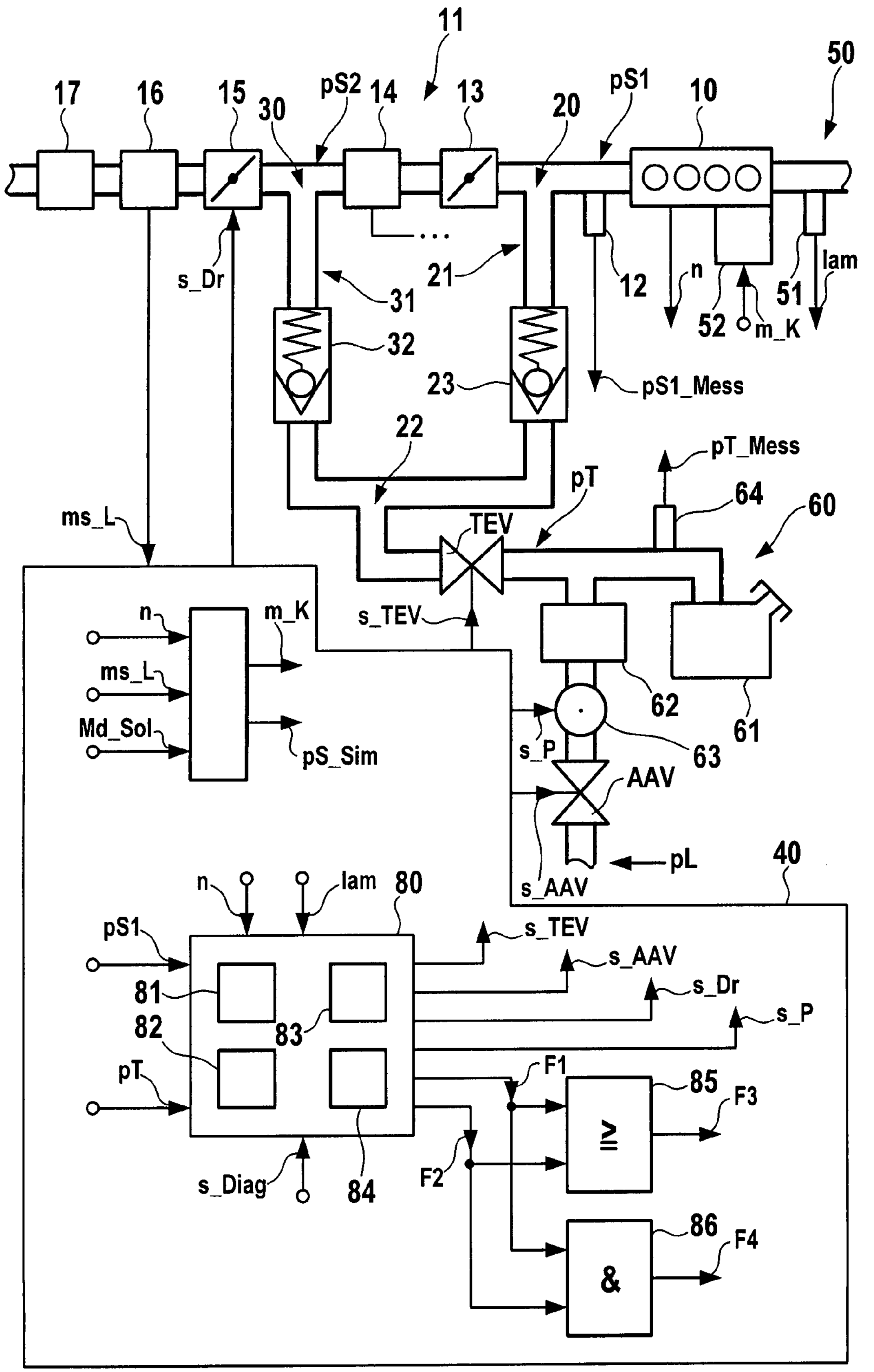
11
50
17
16
15
30
pS2
14
13
20
pS1
10
s_Dr
21
31
12
n
lam
52
51
m_K
32
23
pS1_Mess
22
pT_Mess
pT
64
60
TEV
ms_L
n
m_K
s_TEV
ms_L
62
61
Md_Sol
pS_Sim
63
s_P
AAV
pL
40
s_AAV
n
lam
80
pS1
s_TEV
s_AAV
81
s_Dr
82
83
s_P
pT
F1
85
F3
≥
F2
s_Diag
84
86
F4
&

PROCEDURE TO DIAGNOSE A FUEL TANK VENTILATION SYSTEM AND DEVICE TO IMPLEMENT THE PROCEDURE

The invention proceeds from a procedure to diagnose a fuel tank ventilation system of a motor vehicle with at least two ventilation pathways discharging in the air intake area of an internal combustion engine and a device to implement the procedure according to the class of the independent claims.

The subject matter of the invention at hand is a computer program as well as a computer program product.

In the German patent DE 43 42 431 A1 a fuel tank ventilation system for an internal combustion engine of a motor vehicle is described, in which assertions about the condition of the fuel tank ventilation system are derived from the result of pressure measurements in the fuel tank system.

In the German patent DE 196 48 711 A1 a procedure is described to determine the flow rate through a fuel tank ventilation valve of a fuel tank ventilation system, in which the difference of the pressures occurring at the fuel tank ventilation valve is determined and in which inference can be made about the fuel vapor volume flow through the fuel tank ventilation valve from this difference.

In the German patent DE 103 32 701 A1 a procedure for the fuel tank ventilation for an internal combustion engine is described, which can be operated in two different operation modes. Provision is made for a homogeneous engine operation and a stratification operation to be the operation modes. The regeneration of an active charcoal filter contained in the fuel tank ventilation can occur independently of the degree of depletion of the active charcoal filter during the homogenous engine operation and during the stratification operation as a function of the degree of depletion.

The procedural approach according to the invention with the characteristics of the independent procedural claim has the advantage of a complete diagnosis of a fuel tank ventilation system with at least two discharge points in the air intake area of an internal combustion engine. The On-Board-Diagnosis provides at least an error signal as a function of the diagnostic result and consequently signals an error in the fuel tank ventilation system, which can be relevant to the control of emissions. The procedural approach according to the invention, therefore, contributes to the assurance of a reliable prevention of harmful emissions during the operation of the motor vehicle.

Provision is made for at least two partial diagnoses, whereby a first partial diagnosis is implemented in conjunction with the first ventilation pathway, if the pressure in the discharge area of the first ventilation pathway is smaller than the fuel tank system pressure; and the second partial diagnosis is implemented in conjunction with the second ventilation pathway, if the pressure in the discharge area of the first ventilation pathway is greater that the fuel tank system pressure.

An error signal is provided, if at least one of the partial diagnoses generates a partial error signal.

As an alternative to the criterion that the pressure in the discharge area of the first ventilation pathway is smaller or greater than the fuel tank system pressure, the discrimination using the different operating conditions of the internal combustion engine can take place. It can be determined if the internal combustion engine is in the supercharging mode of operation or in the air intake mode of operation.

Advantageous modifications and embodiments of the procedural approach result from the independent claims.

Provision is made in one embodiment for the diagnosis to be implemented on the basis of the assessment of a measurement for the pressure and/or the pressure change in the fuel tank system. As provision is made in any case to acquire at least one measurement for the pressure in the fuel tank system, no additional sensors are required to implement the procedure.

Provision is made in one embodiment to activate the opening of a fuel tank ventilation valve disposed in the fuel tank ventilation system, when the intake manifold pressure in the discharge area of the first ventilation pathway is greater than the fuel tank system pressure. Additionally provision is made for the second partial error signal to be provided, which signals an error in the second ventilation pathway, if no lowering of the fuel tank system pressure is recognized.

Provision is made in another embodiment to provide a first partial error signal, which signals an error in the first ventilation pathway, if an elevation in the fuel tank system pressure is recognized. With this step, especially a check valve disposed in the first ventilation pathway, which is sticking open, can be recognized.

Provision is made in an additional embodiment to activate the opening of a fuel tank ventilation valve disposed in the fuel tank ventilation system, when the intake manifold pressure in the discharge area of the first ventilation pathway is smaller than the fuel tank system pressure; and provision is made for a second partial error signal to be provided, which signals an error in the second ventilation pathway, if the fuel tank system pressure lowers more slowly than expected or even elevates. With this step a partial diagnosis in the air intake mode of operation of the internal combustion engine is possible, whereby especially a second check valve disposed in the second ventilation pathway can be recognized as sticking open.

Provision is made in an embodiment to activate the opening of a fuel tank ventilation valve disposed in the fuel tank ventilation system, when the intake manifold pressure in the discharge area of the first ventilation pathway is smaller than the fuel tank system pressure; and provision is made for the first partial diagnostic signal to be provided, which signals an error in the first ventilation pathway, if the fuel tank system pressure and/or the exhaust gas lambda and/or the engine rotational speed of the internal combustion engine and/or the idling regulation do not change as expected. With this step the ventilation pathway in the air intake mode of operation of the internal combustion engine can be tested. The emergence of the first partial diagnostic signal indicates an impermeable first ventilation pathway and/or a fuel tank ventilation valve, which is sticking open.

Provision is made in an embodiment of the procedural approach according to the invention to conduct a change in the pressure in the fuel tank system before opening the fuel tank ventilation valve. With this step the sensitivity of the diagnosis can be expanded.

Provision is made in an additional embodiment of the procedural approach according to the invention to obtain at least a measurement for the fuel tank system pressure using an electrical parameter and/or the rotational speed of an electrical pump. With this step the diagnosis according to the invention can be cost effectively implemented because no special sensor is required. Provision is made for a modification of this embodiment to operate the electrical pump both before and after the opening of the tank ventilation valve and to recognize a fall or a rise in fuel system pressure using an electrical parameter of the pump and/or a change in the rotational speed of the pump.

Provision is made for a special assessment of the partial error signals in the case that both partial error signals are present. If applicable both ventilation pathways are assessed to be in good working order and an error in the central ventilation pathway is inferred, which lies between the fuel tank system and the division into at least one first and at least one second ventilation pathway. With this step the diagnostic possibilities on the central ventilation pathway are expanded.

Provision is made in one embodiment for a targeted limiting of the air flow in the air intake area upstream in front of the discharge area of the second ventilation pathway into the air intake area. With this step the sensitivity of the diagnosis can likewise be expanded. The limiting of the air flow can, for example, be implemented with an electrically switched butterfly valve.

Provision is made in an additional embodiment, which likewise contributes to an increase in the sensitivity of the diagnosis, for an activated closing of an aeration valve for the fuel tank system.

The device according to the invention to implement the procedure concerns initially a control unit, which is specially designed for the implementation of the procedure.

The control unit preferably contains at least one electrical storage unit, in which the procedural steps are deposited as a computer program.

Provision is made in the computer program according to the invention to implement all steps of the procedure according to the invention, if it is run on a computer.

The computer program product according to the invention with a program code stored on a machine-readable carrier conducts the procedure according to the invention, if the program is implemented on a computer or in a control unit.

Additional advantageous modifications and embodiments of the procedural approach according to the invention result from additional dependent claims. Examples of embodiment of the invention are depicted in the drawing and are explained in detail in the following description.

The Figure shows a technical layout, in which a procedure according to the invention is operating.

FIG. 1 shows an internal combustion engine 10, in whose air intake area 11 an intake manifold pressure sensor 12, a first throttle 13, a supercharger 14, a second throttle 15, an air sensor 16 as well as an air filter 17 are disposed.

A first discharge area 20 of a first ventilation pathway 21, which lies between a division 22 and the first discharge area 20, lies between the first throttle 13 and the internal combustion engine 10. The intake manifold pressure sensor 12 acquires the intake manifold pressure pS1 in the first discharge area 20 and supplies the intake manifold pressure-measurement signal pS1_Mess. The first ventilation pathway 21 contains a first check valve 23.

A second discharge area 30 of a second ventilation pathway 31 lies between the supercharger 14 and the second throttle 15. This second ventilation pathway 31 lies between the division 22 and the second discharge area 30. A second intake manifold pressure pS2 occurs in the second discharge area 30. The second ventilation pathway 31 contains a second check valve 32.

The intake manifold pressure-measurement signal pS-Mess is provided to a control unit 40. The air sensor 16 releases an air signal ms_L to the control unit 40. The internal combustion engine 10 provides the control unit 40 with an engine rotational speed n. A lambda sensor 51 disposed in the exhaust gas area 50 of the internal combustion engine 10 provides the control unit 40 with a lambda signal lam.

The control unit provides a throttle control signal s_Dr to the second throttle 15 as well as a fuel signal m_K to a fuel metering assembly 52 assigned to the internal combustion engine 10.

The division 22 is connected to a fuel tank ventilation valve TEV, which can connect both of the ventilation pathways 21, 31 to a fuel tank system 60. The fuel tank system 60 contains a fuel tank 61, an active charcoal filter 62, a pump 63, an aeration valve AAV as well as a fuel tank system-pressure sensor 64, which acquires the fuel tank system pressure pT occurring in the fuel tank system 60 and provides this pressure as a fuel tank system pressure-measurement signal pT_Mess to the control unit 40.

The fuel tank ventilation valve TEV is supplied with a fuel tank ventilation valve control signal s_TEV by the control unit 40, the pump 63 with a pump activation signal s_P and the aeration valve AAV with an aeration valve activation signal s_AAV. The ambient air pressure pL arises at the aeration valve AAV.

The control unit 40 contains a fuel signal ascertainment 70, which is provided with the engine rotational speed n, the air signal ms_L as well as a torque set point Md_Soll and which provides the fuel signal m_K as well as a calculated intake manifold pressure pS_Sim.

The control unit 40 contains additionally a diagnostic configuration 80, which is provided with the first intake manifold pressure pS1, the fuel tank system pressure pT, the engine rotational speed n, the lambda signal lam as well a diagnostic starting signal s_Diag and which provides the fuel tank ventilation valve activation signal s_TEV, the aeration valve activation signal s_AAV, the throttle activation signal s_Dr, the pump activation signal s_P, a first partial error signal F1 and a second partial error signal F2.

The diagnostic configuration 80 contains a first partial diagnosis 81, a second partial diagnosis 82, a difference ascertainment 83 and a difference quotient ascertainment 84.

Both partial error signals F1, F2 are provided to a disjunction 85 as well as to an AND gating 86. The disjunction 85 provides a first error signal F3 and the AND gating a second error signal F4.

The procedure according to the invention proceeds in the following manner:

The fuel tank system 60 provides fuel to the internal combustion engine 10. The internal combustion engine 10 can be operated in at least two different operating states, whereby a first operating state corresponds to an air intake mode of operation and a second operating state to a supercharging mode of operation of the internal combustion engine 10.

The supercharging mode of operation of the internal combustion engine 10 is accomplished by a super charger 14, which, for example, is the super charger of an exhaust gas turbocharger system or, for example, the super charger of an electrically driven pump. The division into two ventilation pathways 21, 31 allows for a ventilation of the fuel tank system 60 during a supercharging mode of operation of the internal combustion engine 10, which is of longer duration. In such a mode of operation, the first intake manifold pressure pS1 in the first discharge area 20 generally is higher than the fuel tank system pressure pT; so that when the fuel tank ventilation valve TEV is being opened via activation, the first check valve 23 is closed.

In this case the second ventilation pathway 31 provides a possibility for a fuel tank ventilation, which thereby results because a fall in pressure especially at the air filter 17 can be assumed due to the generally elevated air flow rate in the supercharging mode of operation of the internal combustion engine 10 in the air intake area 11. This drop in pressure makes possible for the second air intake pressure pS2 to be lower than the fuel tank system pressure pT. Thus, when the fuel tank ventilation valve TEV is activated to open, the second check valve 32 can open.

A diagnosis of the fuel tank ventilation system, which contains the fuel tank ventilation valve TEV, the division 22, the two ventilation pathways 21, 31 as well as the check valves 23, 32 respectively disposed in them, is divided into the first and second partial diagnosis 81, 82; whereby the first partial diagnosis 81 determines an error in the first ventilation pathway 21, and the second partial diagnosis determines an error in the second ventilation pathway 31.

The diagnosis of the fuel tank ventilation system 21, 22, 23, 31, 32, TEV is based especially on an assessment of a measurement for the fuel tank system pressure pT in the depicted example of embodiment, which is acquired by a fuel tank system pressure sensor 64 and provided to the control unit 40 as the fuel tank system pressure-measurement signal pT_Mess in the depicted example of embodiment. Assessment possibilities of other parameters are described further below. The partial diagnoses 81, 82 assess particularly a change in the fuel tank system pressure pT. The assessment can apply to a difference in the fuel tank system pressures pT acquired at different points in time and/or to an assessment of the difference quotients of the fuel tank system pressure pT. The different points in time to acquire the pressure difference can especially be the starting point in time of the diagnosis as well an additional point in time, at which at least a quasi-stationary pressure state exists. The diagnostic configuration 80 thus contains the difference ascertainment 83 and the difference quotient ascertainment 84.

Different diagnoses can be implemented as a function of the pressure ratios between the first/second intake manifold pressure pS1, pS2 and the fuel tank system pressure pT.

The first partial diagnosis 81 pertaining to the first ventilation pathway 21 is implemented, if the first intake manifold pressure pS1 in the first discharge area 20 of the first ventilation pathway 21 is greater than the fuel tank system pressure pT. The second partial diagnosis 82 can likewise detect an error in this operating state.

The second partial diagnosis 82 pertaining to the second ventilation pathway 31 is implemented, if the second intake manifold pressure pS2 is greater than the fuel tank system pressure pT. The first partial diagnosis 81 can likewise detect an error in this operating state.

As already mentioned, the shortfall, whether the first intake manifold pressure pS1 in the area of the first discharge area 20 is greater or smaller than the fuel tank system pressure pT, is tantamount to the shortfall between at least two different operating states of the internal combustion engine 10, whereby the first operating state corresponds to the air intake mode of operation and the second operating state corresponds to the supercharging mode of operation of the internal combustion engine 10. The first intake manifold pressure pS1 can be acquired by the intake manifold pressure sensor 12 and provided to the control unit 40 as the intake manifold pressure-measurement signal pS1_Mess. Alternatively or additionally, the fuel signal ascertainment 70 can rate the intake manifold pressure-simulation signal pS_Sim using the parameters made available. The intake manifold pressure-simulation signal pS_Sim is used as the first intake manifold pressure pS1.

The diagnosis is started with the provision of the diagnostic starting signal s_Diag, which is fed to the diagnostic configuration 80. In order to implement the diagnosis, the fuel tank ventilation valve TEV is activated to open by the fuel tank ventilation valve activation signal s_TEV.

The second partial error signal F2, which signals an error in the second ventilation pathway 31, is generated under the precondition within the scope of the second partial diagnosis 82 that a first intake manifold pressure pS1 is greater than the fuel tank system pressure pT and the tank ventilation valve TEV is activated to the open position, if no fall in pressure in the fuel tank system 60 is recognized.

In this diagnostic state, the fuel tank ventilation can only result across the second ventilation pathway 31, because due to the pressure ratios only the second check valve 32 can open. As a result of the extraction of the fuel vapors out of the fuel tank system 60 and into the exhaust gas area 11, at least a slight fall in pressure in the fuel tank system 60 must be detected. If this is not the case, an error can be assigned to the second ventilation pathway 31. An error is, for example, a detached hose connection or a blockage in the second ventilation pathway 31. Furthermore the fuel tank ventilation valve TEV can stick in the open position. Provided the last-mentioned error has occurred, no drop in the fuel tank system pressure pT can likewise be determined because already at the beginning of the diagnosis, a slight pressure level, which can drop no further, is assumed due to the fuel tank ventilation constantly taking place in contrast to the error free operation.

Under the same diagnostic preconditions, the first partial diagnosis 81 can provide the first partial error signal F1, which signals an error in the first ventilation pathway 21, if an elevation in the fuel tank system pressure pT is recognized. In this case, it must be assumed that a connection continually exists between the fuel tank system 60 and the first discharge area 20. This error especially arises in that way, in that the first check valve 23 disposed in the first ventilation pathway 21 often jams open.

Another diagnosis proceeds from the assumption that the first intake manifold pressure pS1 is smaller than the fuel tank system pressure pT and that the fuel tank ventilation valve TEV is activated to the open position. The second partial error signal F2 is provided, which signals an error in the second ventilation pathway 31, if the fuel tank system pressure pT falls more slowly than expected or even rises. During this diagnosis, the internal combustion engine 10 is in the air intake mode of operation. As a result of the fuel tank ventilation taking place during the diagnosis, a certain drop in pressure of the fuel tank system pressure pT can be anticipated, whereby a specified pressure gradient or a pressure difference observed over an extended time period until a quasi-stationary condition is achieved has to be undershot in order that no error exists. If the expected pressure drop is not achieved, a second check valve 32 sticking open can be the cause.

In this diagnostic operating state, the first partial error signal F1 can also emerge, if the fuel tank system pressure pT and/or the exhaust gas lambda and/or the engine rotational speed n of the internal combustion engine 10 and/or an unspecified idling regulation of the internal combustion engine 10 do not perform as expected, respectively change. This diagnosis corresponds to the generally known diverse diagnoses of a fuel tank ventilation system 21, 22, 23, 31, 32, TEV with only one ventilation pathway, which in the case at hand corresponds to the first ventilation pathway 21.

The exhaust gas lambda is acquired by the lambda sensor 51 downstream in back of the internal combustion engine 10 and is provided as the lambda signal lam to the control unit 40, respectively the diagnostic configuration 80. A correctly working fuel tank ventilation system 21, 22, 23, 31, 32, TEV leads, for example, to an enrichment of the exhaust gas lambda and/or to an increase in the rotational speed n of the internal combustion engine 10 and/or to a drop in the fuel tank system pressure pT and/or to a retraction of a control variable within an idling regulation for the internal combustion engine 10. The variables mentioned can therefore be taken as a basis for the formation of the first partial error signal F1.

An emergence of the first partial error signal F1 points in this case to an impermeable first ventilation pathway 21 and/or to a fuel tank ventilation valve TEV stuck in the open position.

Provided the first and second partial error signal F1, F2 occur, it can definitely be assumed that in each individual ventilation pathway 21, 31, an error has occurred. This case might, however, be improbable. Therefore, provision is made for the AND gating 86, which supplies the second error signal F4, which points specifically to an error between the division 22 and the fuel tank system 60. Especially a defect of the fuel tank ventilation valve TEV can exist.

The assessment of the changes of signals underlying the diagnosis is more reliable, if the expected signal changes become greater. A step to increase the signal-to-noise ratio is thereby possible, in that an increase of the fuel tank system pressure pT is conducted before the opening of the tank ventilation valve TEV is activated. The pump 63, for which provision is made if necessary, can supply the pressure.

The pump 63 can be disposed in an unspecified diagnostic module, which contains additionally if need be the fuel tank system pressure sensor 64 and/or the aeration valve AAV. Another step to increase the signal-to-noise ratio, for which provision can be made if necessary, is thereby possible, in that the closing activation of the aeration valve AAV is conducted after the start of the diagnosis. By means of the closing activation of the aeration valve AAV, a greater pressure difference can emerge during the diagnosis. Moreover, plausibility checks can be conducted with the opening and the closing of the aeration valve AAV.

An effective step to increase the signal-to-noise ratio during the diagnosis is thereby possible, in that provision is made for the second throttle 15 upstream in front of the second discharge area 30 of the second ventilation pathway 31. This second throttle 15 allows for a targeted exertion of influence on the air flow in the second discharge area 30. The drop in pressure arising without the second throttle 15 as opposed to the ambient air temperature pL depends especially on the flow resistance of the air filter S 17 as well as from the additional components in the exhaust gas area 17 upstream in front of the second discharge area 30, which, however, for example, should hardly exceed 50 mbar. With the second throttle, the pressure drop can be specifically manipulated and significantly increased. If need be, the second throttle 15 can completely take over the function of the first throttle 13 at least during the diagnosis.

The diagnosis to assess the fuel tank system pressure pT can additionally or alternatively be firmed up on the basis of the assessment of an electrical parameter of the pump 63, whereby preferably the current drawn by the pump 63 is taken as a basis. Alternatively or additionally the rotational speed of the pump 63 can be assessed.

The invention claimed is:

1. A method of diagnosing a fuel tank ventilation system of a motor vehicle, which has at least one first ventilation pathway discharging into an air intake area of an internal combustion engine downstream of a supercharger and at least one second ventilation pathway discharging into the air intake area upstream of the supercharger, the method comprising:

if an intake manifold pressure in a discharge area of the first ventilation pathway is smaller than a fuel tank pressure, implementing a first partial diagnosis;

if the intake manifold pressure is greater than the fuel tank system pressure, implementing a second partial diagnosis; and providing an error signal if the first partial diagnosis generates a first partial error signal or if the second partial diagnosis generates a second partial error signal.

2. A method according to claim 1, wherein diagnosis is implemented on a basis of an assessment of a measurement for the fuel tank system pressure or a pressure change of the fuel tank system pressure.

3. A method according to claim 2, further comprising when the intake manifold pressure in the discharge area of the first ventilation pathway exists, which is greater than the fuel tank system pressure, opening a fuel tank ventilation valve disposed in the fuel tank ventilation system; and generating the second partial error signal, which signals an error in the second ventilation pathway, if no drop in the fuel tank system pressure is detected.

4. A method according to claim 3, wherein the first partial error signal signals an error in the first ventilation pathway, if an increase in the fuel tank system pressure is detected.

5. A method according to claim 4, wherein the first partial error signal indicates that a first check valve disposed in the first ventilation pathway is sticking open.

6. A method according to claim 2, further comprising when the intake manifold pressure in the discharge area of the first ventilation pathway exists, which is smaller than the fuel tank system pressure, opening a fuel tank ventilation valve disposed in the fuel tank ventilation system; and generating the second partial error signal, which signals an error in the second ventilation pathway, if the fuel tank system pressure increases or drops more slowly than expected.

7. A method according to claim 6, wherein the second partial error signal, indicates that a second check valve disposed in the second ventilation pathway is sticking open.

8. A method according to claim 2, further comprising when the intake manifold pressure in the discharge area of the first ventilation pathway exists, which is smaller than the fuel tank system pressure, opening a fuel tank ventilation valve disposed in the fuel tank ventilation system; and generating the first partial error signal, which signals an error in the first ventilation pathway, if the fuel tank system pressure, an exhaust gas lambda, a rotational speed of the internal combustion engine, or a parameter of an idling regulation of the internal combustion engine does not change as expected.

9. A method according to claim 8, wherein upon an emergence of the first partial error signal, an impermeable first ventilation pathway or the fuel tank ventilation valve sticking open can be inferred.

10. A method according to claim 1, further comprising changing the fuel tank system pressure before opening of a fuel tank ventilation valve.

11. A method according to claim 1, further comprising obtaining at least a measurement for a fuel tank system pressure using an electrical parameter or a rotational speed of an electrical pump.

12. A method according to claim 11, wherein the electrical pump is operated both before and after opening of a fuel tank ventilation valve, and a drop or increase in the measurement for the fuel tank system pressure is recognized using an electrical parameter of the pump or a change in the rotational speed of the pump.

13. A method according to claim 1, further comprising inferring an error in a central ventilation pathway, if both partial error signals exist, which lies between the fuel tank system and the division into at least one first and at least one second ventilation pathway.

14. A method according to claim 1, wherein a targeted limiting of air flow in the air intake area upstream of the discharge area of the second ventilation pathway exists.

15. A method according to claim 1, further comprising performing a controlled closing of an aeration valve for the fuel tank system.

16. A device that diagnoses a fuel tank ventilation system of a motor vehicle, which has at least one first ventilation pathway discharging into an air intake area of an internal combustion engine downstream of a supercharger and at least one second ventilation pathway discharging into the air intake area upstream of the supercharger, the device comprising a control unit that implements a first partial diagnosis if an intake manifold pressure in a discharge area of the first ventilation pathway is smaller than a fuel tank pressure; implements a second partial diagnosis if the intake manifold pressure is greater than the fuel tank system pressure; and provides an error signal if the first partial diagnosis generates a first partial error signal or if the second partial diagnosis generates a second partial error signal.

17. A computer program on a computer readable medium that includes instructions that diagnoses a fuel tank ventilation system of a motor vehicle, which has at least one first ventilation pathway discharging into an air intake area of an internal combustion engine downstream of a supercharger and at least one second ventilation pathway discharging into the air intake area upstream of the supercharger, the computer program having instructions that implement a first partial diagnosis if an intake manifold pressure in a discharge area of the first ventilation pathway is smaller than a fuel tank pressure; implement a second partial diagnosis if the intake manifold pressure is greater than the fuel tank pressure; and provide an error signal if the first partial diagnosis generates a first partial error signal or if the second partial diagnosis generates a second partial error signal.

18. A computer program product with a stored program code on a computer readable medium that includes instructions that diagnoses a fuel tank ventilation system of a motor vehicle, which has at least one first ventilation pathway discharging into an air intake area of an internal combustion engine downstream of a supercharger and at least one second ventilation pathway discharging into the air intake area upstream of the supercharger, the computer program having instructions that implement a first partial diagnosis if an intake manifold pressure in a discharge area of the first ventilation pathway is smaller than a fuel tank pressure; implement a second partial diagnosis if the intake manifold pressure is greater than the fuel tank system pressure; and provide an error signal if the first partial diagnosis generates a first partial error signal or if the second partial diagnosis generates a second partial error signal.

* * * * *